United States Patent
Suzuki

(10) Patent No.: US 9,982,718 B2
(45) Date of Patent: May 29, 2018

(54) TAPERED ROLLER BEARING

(71) Applicant: JTEKT CORPORATION, Osaka-shi, Osaka (JP)

(72) Inventor: Akiyuki Suzuki, Nagoya (JP)

(73) Assignee: JTEKT CORPORATION, Osaka (JP)

( * ) Notice: Subject to any disclaimer, the term of this patent is extended or adjusted under 35 U.S.C. 154(b) by 0 days. days.

(21) Appl. No.: 15/372,830

(22) Filed: Dec. 8, 2016

(65) Prior Publication Data

US 2017/0175816 A1    Jun. 22, 2017

(30) Foreign Application Priority Data

Dec. 17, 2015  (JP) ................. 2015-245959

(51) Int. Cl.
    *F16C 33/78*    (2006.01)
    *F16C 19/36*    (2006.01)
    *F16C 33/46*    (2006.01)

(52) U.S. Cl.
    CPC ........ *F16C 33/7813* (2013.01); *F16C 19/364* (2013.01); *F16C 33/4635* (2013.01); *F16C 2240/46* (2013.01)

(58) Field of Classification Search
    CPC .... F16C 33/586; F16C 33/60; F16C 33/6651; F16C 33/6674; F16C 33/7886; F16C 33/783; F16C 43/04; F16C 2361/61; F16C 19/364; F16C 19/383–19/388; F16C 19/366; F16C 33/4635; F16C 2240/46
    See application file for complete search history.

(56) References Cited

U.S. PATENT DOCUMENTS

| | | | |
|---|---|---|---|
| 7,484,894 B2* | 2/2009 | Toda | C21D 1/18 384/450 |
| 7,645,074 B2* | 1/2010 | Chiba | F16C 19/364 384/571 |
| 7,874,736 B2* | 1/2011 | Ueno | F16C 19/364 384/565 |
| 7,874,737 B2* | 1/2011 | Matsuyama | F16C 33/36 384/450 |
| 7,950,856 B2* | 5/2011 | Sada | F16C 19/364 384/473 |
| 8,535,009 B2* | 9/2013 | Hofmann | F16C 19/386 290/44 |
| 8,783,965 B2* | 7/2014 | Tsujimoto | F16C 19/364 384/470 |
| 8,851,761 B2* | 10/2014 | Miyachi | F16C 19/364 384/576 |
| 2008/0205813 A1* | 8/2008 | Sada | F16C 33/46 384/571 |
| 2010/0111459 A1* | 5/2010 | Yasuda | F16C 33/526 384/548 |
| 2014/0013603 A1* | 1/2014 | Miyachi | B25B 27/14 29/898.064 |

(Continued)

FOREIGN PATENT DOCUMENTS

JP    2008-057791 A    3/2008
JP    2008-223891 A    9/2008

*Primary Examiner* — Alan B Waits
(74) *Attorney, Agent, or Firm* — Oliff PLC

(57) ABSTRACT

A tapered roller bearing includes an outer ring, an inner ring, tapered rollers, a cage, and a lubricant holding member. The cage is formed of resin. Since the cage is formed of resin, the tapered roller bearing can be downsized with contact between the cage and the lubricant holding member avoided.

6 Claims, 7 Drawing Sheets

(56) References Cited

U.S. PATENT DOCUMENTS

2014/0193109 A1* 7/2014 Baratti .................. F16C 33/783
                                                    384/448
2015/0323008 A1* 11/2015 Koganei ............... F16C 19/364
                                                    384/564

* cited by examiner

SMALL DIAMETER SIDE ←→ LARGE DIAMETER SIDE
AXIAL DIRECTION

TAPERED ROLLER BEARING

INCORPORATION BY REFERENCE

The disclosure of Japanese Patent Application No. 2015-245959 filed on Dec. 17, 2015 including the specification, drawings and abstract, is incorporated herein by reference in its entirety.

BACKGROUND OF THE INVENTION

1. Field of the Invention

The invention relates to a tapered roller bearing, and in particular, to a tapered roller bearing that stores a lubricant in a space where tapered rollers roll.

2. Description of the Related Art

A tapered roller bearing includes an outer ring, an inner ring, a plurality of tapered rollers, and a cage. The tapered rollers are arranged such that an axis of each roller around which the roller rolls is inclined with respect to an axis of the tapered roller bearing. A large-diameter bottom face (hereinafter also referred to as a roller large end face) of the tapered roller is arranged outward of a small-diameter bottom face (hereinafter also referred to as a roller small end face) in a radial direction of the bearing.

The tapered roller bearing characteristically needs to offer enhanced resistance to seizure between the roller large end faces of the tapered rollers and a surface of the inner ring that contacts the roller large end faces (hereinafter referred to as a cone back face rib surface) and to suppress wear of a pocket surface of the cage of the tapered roller bearing. As such a tapered roller bearing, a tapered roller bearing is known in which a lubricant holding member is attached to the outer ring so that a lubricant can be stored in a space between the lubricant holding member and the outer ring (for example, Japanese Patent Application Publication No. 2008-057791 (JP 2008-057791 A) and Japanese Patent Application Publication No. 2008-223891 (JP 2008-223891 A)).

In the tapered roller bearing, the lubricant holding member is integrally attached to the outer ring. In contrast, the cage rotates with respect to the outer ring when the bearing rotates. Thus, when the cage and the lubricant holding member are in contact with each other, friction may occur between the cage and the lubricant holding member to affect a rotating operation of the bearing.

In general, the cage is formed of metal and manufactured by press molding, and thus, changing the shape of the cage is difficult. Thus, to arrange the cage and the lubricant holding member so as to avoid contact between the cage and the lubricant holding member, the axial dimension of the lubricant holding member needs to be sufficiently large to form a clearance between the lubricant holding member and the cage.

On the other hand, there has been a demand to downsize the tapered roller bearing in order to increase the degree of freedom of installation of the tapered roller bearing. Therefore, the lubricant holding member is preferably downsized.

SUMMARY OF THE INVENTION

An object of the invention is to suppress possible friction between a cage and a lubricant holding member in a tapered roller bearing including the lubricant holding member and to downsize the tapered roller bearing.

A tapered roller bearing in an aspect of the invention includes an outer ring having a first raceway surface on an inner peripheral surface of the outer ring, an inner ring having a second raceway surface on an outer peripheral surface of the inner ring and arranged coaxially with the outer ring, a plurality of tapered rollers arranged in a space between the first raceway surface and the second raceway surface, each of the tapered rollers being inclined with respect to a bearing axis such that a distance between a roller axis and the bearing axis increases from a small-diameter-side bottom face toward a large-diameter-side bottom face, a resin cage in which a plurality of pockets is formed so that the tapered rollers are housed in the respective pockets, and a lubricant holding member fixed integrally to the outer ring. The lubricant holding member includes a circular-ring-like annular portion and a cylindrical tubular portion having an axially outward end connected to a radially outward end of the annular portion and fixed to one of two axial ends of the outer ring, which is closer to the large-diameter-side bottom face.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
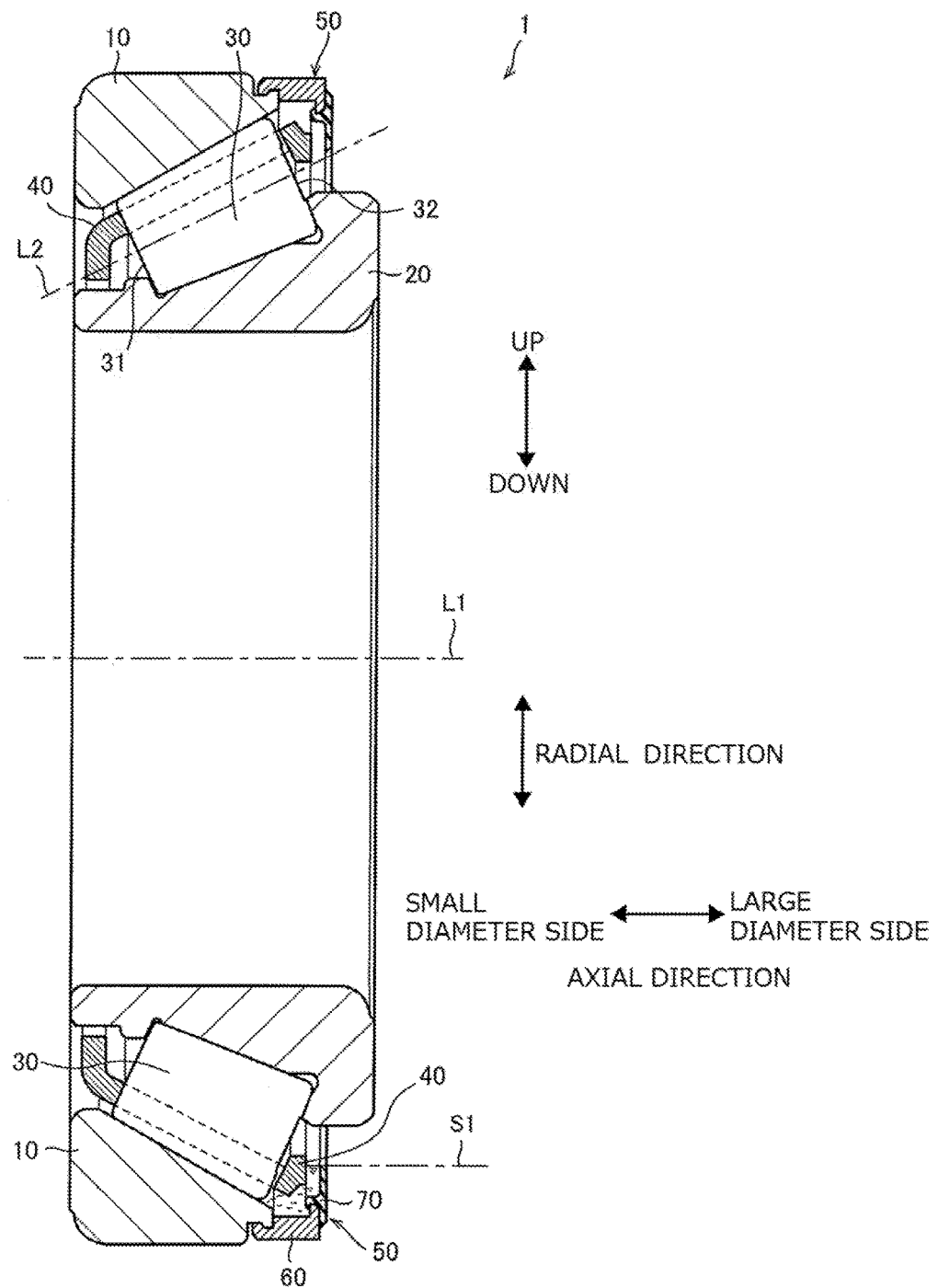
FIG. 1 is a sectional view depicting a general configuration of a tapered roller bearing in a first embodiment.

A tapered roller bearing in the invention includes an outer ring, an inner ring, a plurality of tapered rollers, a resin cage, and a lubricant holding member. The outer ring has a first raceway surface on its inner peripheral surface. The inner ring has a second raceway surface on its outer peripheral surface and is arranged coaxially with the outer ring. The tapered rollers are arranged in a space between the first raceway surface and the second raceway surface. Each of the tapered rollers is inclined with respect to a bearing axis such that a distance between a roller axis and a bearing axis increases from a small-diameter-side bottom face toward a large-diameter-side bottom face. A plurality of pockets is formed in the cage so that the tapered rollers are housed in the pockets. The lubricant holding member is fixed integrally to the outer ring. The lubricant holding member includes a circular-ring-like annular portion and a cylindrical tubular portion. The tubular portion has an axially outward end connected to a radially outward end of the annular portion. The tubular portion is fixed to one of two axial ends of the outer ring, which is closer to the the large-diameter-side bottom face.

In the above-described configuration, since the cage is formed of resin, an eased manufacturing restriction is imposed on the shape of the cage, increasing the degree of freedom of the shape of the cage. Thus, the cage and the lubricant holding member can be designed so as to eliminate the need to increase the cage and the lubricant holding member in size and to avoid contact between the cage and the lubricant holding member. Therefore, in the tapered roller bearing in the invention, possible friction between the cage and the lubricant holding member can be reduced. Furthermore, the tapered roller bearing can be downsized.

The cage includes a cage large diameter portion that faces the large-diameter-side bottom faces of the tapered rollers. In the tapered roller bearing in the invention, in a section including the bearing axis and any of the pockets of the cage, the maximum width of the cage large diameter portion in a direction parallel to the roller axis is preferably smaller than the maximum width of the cage large diameter portion in a direction perpendicular to the roller axis.

In the above-described configuration, the maximum width of the cage large diameter portion in the direction parallel to the roller axis is set smaller than the maximum width of the cage large diameter portion in the direction perpendicular to the roller axis. This enables a reduction in the axial dimension of the tapered roller bearing and allows the cage to be made sufficiently strong.

The inner ring has, on an outer peripheral surface thereof, an annular recessed portion having a bottom surface including a second raceway surface. The cage includes a cage large diameter portion that faces the large-diameter-side bottom faces of the tapered rollers. In the tapered roller bearing in the invention, one of two axial ends of the bottom surface of the recessed portion of the inner ring, which is closer to the large-diameter-side bottom faces of the tapered rollers, is preferably positioned axially outward of the axially outward end surface of the cage large diameter portion.

In the above-described configuration, the bottom surface of the recessed portion forms the second raceway surface of the inner ring. The one of the two axial ends of the bottom surface, which is closer to the large-diameter-side bottom faces of the tapered rollers, is set to lie axially outward of the axially outward end surface of the cage large diameter portion. This enables a further reduction in the axial dimension of the tapered roller bearing.

The cage includes a cage large diameter portion that faces the large-diameter-side bottom faces of the tapered rollers. In the tapered roller bearing in the invention, one of two axial end surfaces of the inner ring, which is closer to the large-diameter-side bottom faces of the tapered rollers, is preferably positioned axially outward of an axially outward end surface of the annular portion of the lubricant holding member.

In the above-described configuration, the one of the two axial ends of the inner ring, which is closer to the large-diameter-side bottom faces of the tapered rollers, is set to lie axially outward of the axially outward end surface of the annular portion of the lubricant holding member. This enables a further reduction in the axial dimension of the tapered roller bearing.

The cage includes a cage large diameter portion that faces the large-diameter-side bottom faces of the tapered rollers. In the tapered roller bearing in the invention, a cutout is preferably formed at a radially outward and axially outward portion of the cage large diameter portion in a section including the bearing axis and any of the pockets of the cage.

In the above-described configuration, the cutout is formed. Consequently, the distance between the cage and the lubricant holding member can be reduced without bringing the cage and the lubricant holding member into contact with each other. Therefore, the axial dimension of the tapered roller bearing can be further reduced.

In the tapered roller bearing in the invention, at an end of the outer ring to which the lubricant holding member is fixed, an axial distance between an axial end surface of the outer ring and an axially inward end surface of the annular portion of the lubricant holding member is preferably 4 mm or less.

A preferred embodiment of the invention will be described below in detail with reference to the drawings. In the drawings referred to below, only main members of the component members of the embodiment of the invention are depicted in a simplified manner for convenience of description. Therefore, the invention may include any component members not depicted in the drawings. The dimensions of the members in the drawings do not truly represent the actual dimensions, the dimensional ratio of the members, or the like.

FIG. 1 is a sectional view of a tapered roller bearing 1 in a first embodiment. FIG. 1 is a sectional view of the tapered roller bearing 1 taken along a bearing axis L1. The tapered roller bearing 1 is used, for example, for a bearing apparatus for driving wheels in a vehicle such as an automobile. The "axial direction" as simply referred to herein means the axial direction of the bearing axis L1.

As depicted in FIG. 1, the tapered roller bearing 1 includes an outer ring 10, an inner ring 20, a plurality of tapered rollers 30, a cage 40, and a lubricant holding member 50. The outer ring 10, the inner ring 20, the cage 40, and the lubricant holding member 50 are annular members each having an axis that coincides with the bearing axis L1 of the tapered roller bearing 1.

As depicted in FIG. 1, the outer ring 10 and the inner ring 20 are arranged such that the inner ring 20 is fitted inward of the outer ring 10 in the radial direction. The cage 40 is arranged in a space between the outer ring 10 and the inner ring 20 in the radial direction. The tapered rollers 30 are held by the cage 40. The lubricant holding member 50 is attached to one end of the outer ring 10 in the axial direction.

Each of the tapered rollers 30 is shaped like a truncated cone. A roller axis L2 of the tapered roller 30 is inclined with respect to the bearing axis L1. The distance between the roller axis L2 and the bearing axis L1 increases from a small-diameter-side bottom face 31 (hereinafter also referred to as a small end face 31) toward a large-diameter-side bottom face 32 (hereinafter also referred to as a large end face 32) of the tapered roller 30.

In the description below, the side on which the small end face 31 of the tapered roller 30 is located in the axial direction is referred to as a "small diameter side". The side on which the large end face 32 of the tapered roller 30 is located in the axial direction is referred to as a "large diameter side".

Figure 2:
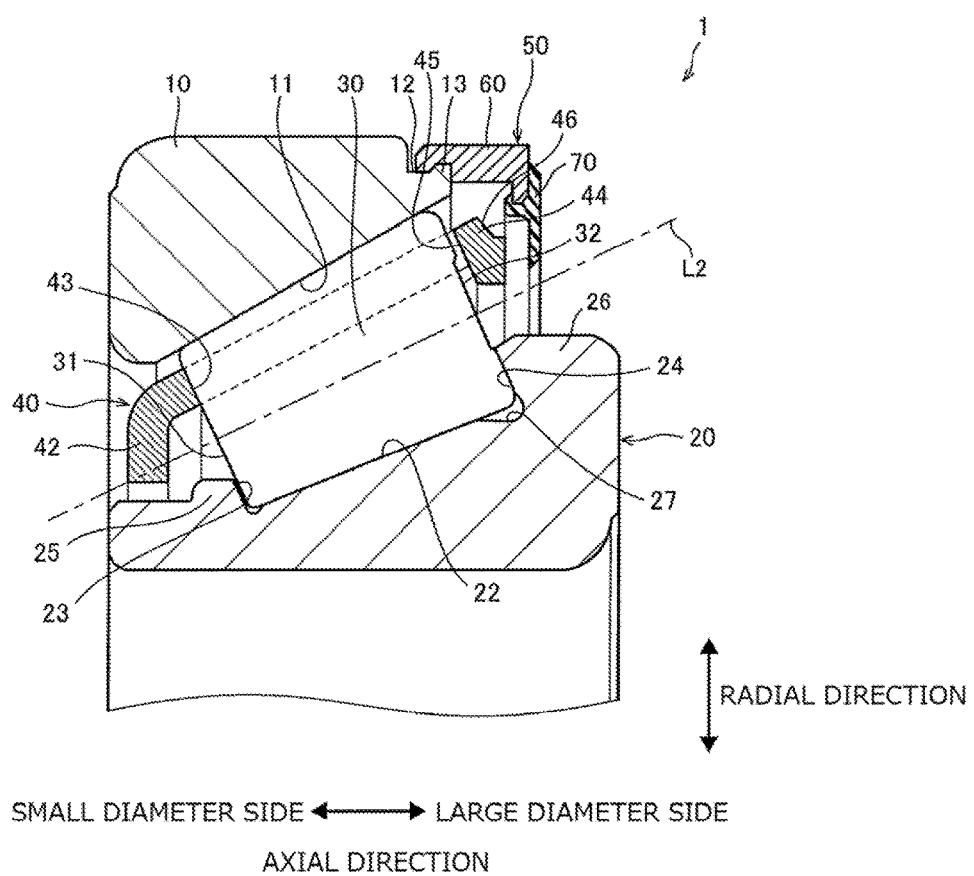
FIG. 2 is a sectional view of the tapered roller bearing in the first embodiment.

FIG. 2 is an enlarged sectional view of a part of the tapered roller bearing 1.

The outer ring 10 has a first raceway surface 11 on an inner peripheral surface of the outer ring 10. The first raceway surface 11 is tapered such that the distance between the first raceway surface 11 and the bearing axis L1 increases from the small diameter side toward the large diameter side.

A large-diameter-side end of the outer peripheral surface of the outer ring 10 is provided with an annular groove 12 and an annular pawl 13. The pawl 13 is formed on the large diameter side of the groove 12. The groove 12 and the pawl 13 are formed to allow the lubricant holding member 50 to be fitted to the outer ring 10.

Figure 3:
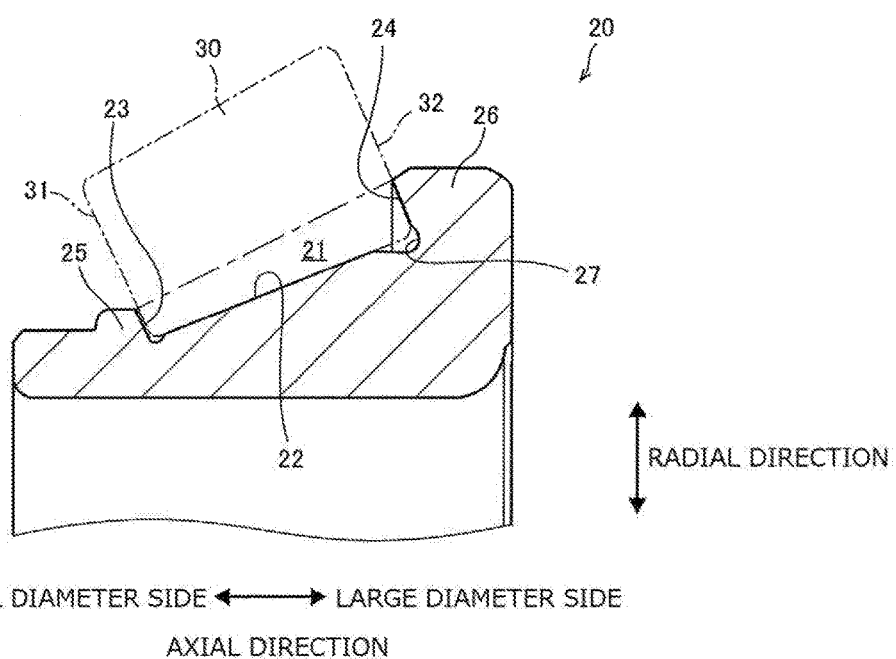
FIG. 3 is a sectional view of an inner ring.

FIG. 3 is a sectional view depicting a part of the inner ring 20. An annular recessed portion 21 is formed in an outer peripheral surface of the inner ring 20. In a section including the bearing axis L1, the recessed portion 21 is shaped generally like a rectangle. A bottom surface of the recessed portion 21 is generally cylindrical and includes a second raceway surface 22. The second raceway surface 22 is tapered such that the distance between the second raceway surface 22 and the bearing axis L1 increases from the small diameter side toward the large diameter side. The taper angle of the second raceway surface 22 is smaller than the taper angle of the first raceway surface 11. A part of each tapered roller 30 is housed in the recessed portion 21.

For circular-ring-like surfaces 23, 24 of the recessed portion 21, the small-diameter-side cone front face rib surface 23 faces the small end faces 31 of the tapered rollers 30. A cone front face rib portion 25 corresponds to a portion of the inner ring 20 located outward of the cone front face rib surface 23 in the axial direction (small diameter side). For the circular-ring-like surfaces 23, 24 of the recessed portion 21, the large-diameter-side cone back face rib surface 24 faces the large end faces 32 of the tapered rollers 30. A cone back face rib portion 26 corresponds to a portion of the inner ring 20 located outward of the cone back face rib surface 24 in the axial direction (large diameter side).

In the recessed portion 21, an annular groove 27 is formed in a portion where the second raceway surface 22 and the cone back face rib surface 24 are connected. The groove 27 is formed to facilitate fitting of the inner ring 20 and the tapered rollers 30. The groove 27 forms a part of the bottom surface of the recessed portion 21. In other words, the groove 27 functions as a recess.

As depicted in FIG. 2, the tapered rollers 30 are arranged in the space formed between the first raceway surface 11 and the second raceway surface 22. As described above, each of the tapered rollers 30 is shaped like a truncated cone, and the roller axis L2 is inclined with respect to the bearing axis L1.

Figure 4:
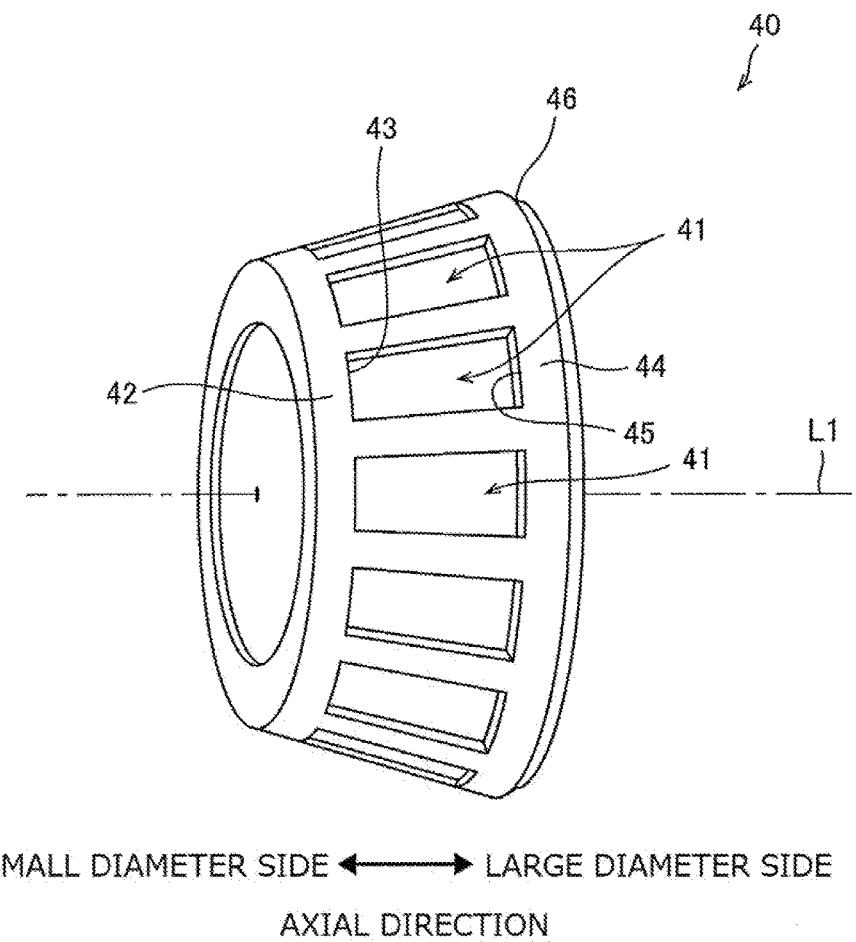
FIG. 4 is a perspective view of a cage.

FIG. 4 is a perspective view of the cage 40. The cage 40 is shaped generally like a circular ring having a taper surface such that the distance between the taper surface and the bearing axis L1 increases from the small diameter side toward the large diameter side. A plurality of pockets 41 is formed in the taper surface of the cage 40. Each of the pockets 41 in the taper surface is shaped generally like a trapezoid in association with the shape of each of the tapered rollers 30.

As depicted in FIG. 2 and FIG. 4, a portion of the cage 40 located on the small diameter side of the pockets 41 serves as a small-end-face holding portion 42. A portion of the cage 40 located on the large diameter side of the pockets 41 serves as a large-end-face holding portion 44. As depicted in FIG. 2, a large-diameter-side surface 43 of the small-end-face holding portion 42 is substantially perpendicular to the roller axis L2 and faces the small end faces 31 of the tapered rollers 30. A small-diameter-side surface 45 of the large-end-face holding portion 44 is substantially perpendicular to the roller axis L2 and faces the large end faces 32 of the tapered rollers 30. The shape of the large-end-face holding portion 44 will be described below in detail.

The cage 40 is formed of resin. The cage 40 is preferably formed of a resin that offers excellent oil resistance and that allows a constant temperature to be maintained. Examples of the resin contained in the cage 40 include 6,6-polyamide (nylon 66, PA66), 4,6-polyamide (nylon 46, PA46), and polyphenylene sulfide (PPS).

The cage 40, which is formed of the resin, can be produced, for example, by injection molding. Since the cage 40 is formed by injection molding, the degree of freedom of design of the cage 40 is high.

Figure 5:
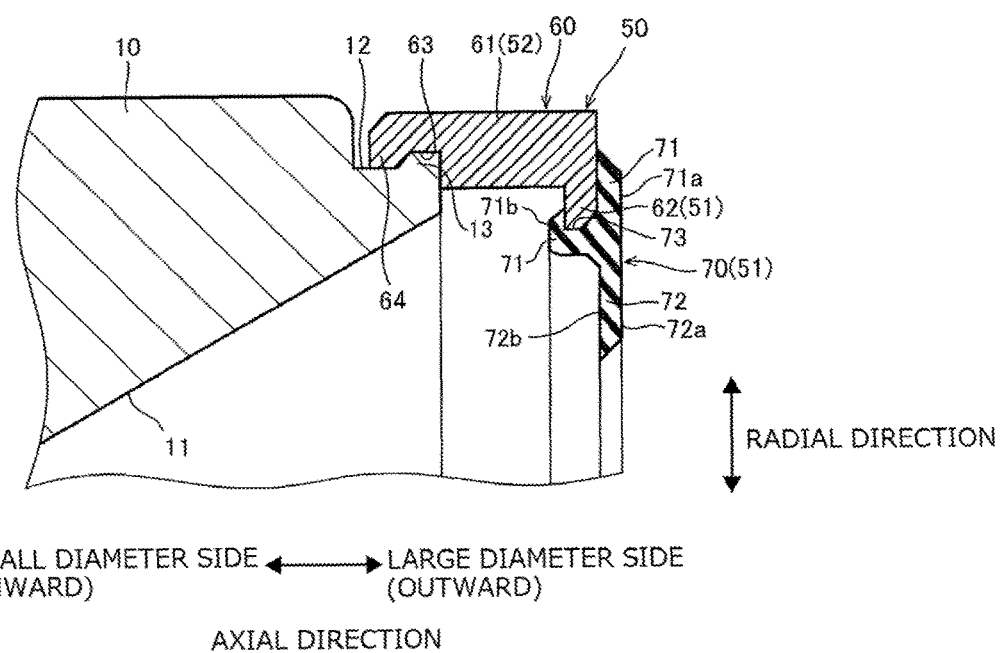
FIG. 5 is a sectional view of an outer ring and a lubricant holding member.

FIG. 5 is a sectional view depicting the lubricant holding member 50 and a part of the outer ring 10. As depicted in FIG. 5, the lubricant holding member 50 includes a ring 60 and an elastic body lip 70.

The ring 60 includes a cylindrical ring main body 61 and an annular pawl 62 that protrudes inward from an inner peripheral surface of the ring main body 61 in the radial direction. The ring main body 61 and the pawl 62 are integrated together. The pawl 62 is formed outward of the ring main body 61 in the axial direction. The ring 60 is formed of metal, for example, stainless steel.

The elastic body lip 70 is shaped generally like a circular ring. A radially outward portion of the elastic body lip 70 is a thick walled portion 71 that is thicker than the pawl 62 of the ring 60 in the axial direction. A radially inward portion of the elastic body lip 70 is a thin walled portion 72 that is thinner than the thick walled portion 71 in the axial direction. The elastic body lip 70 is formed of rubber, for example, nitrile rubber or acrylic rubber.

In the elastic body lip 70, the thick walled portion 71 and the thin walled portion 72 are integrally formed to be continuous with each other. In other words, on an axially inward surface of the elastic body lip 70, a surface 71b of the thick walled portion 71 is positioned inward of a surface 72b of the thin walled portion 72 in the axial direction.

In the thick walled portion 71, a groove 73 extending inward in the radial direction is formed. The groove 73 is formed all over the circumference of the thick walled portion 71. The size of the groove 73 is set to enable the pawl 62 of the ring 60 to be fitted into the groove 73. The pawl 62 is fitted into the groove 73 to combine the ring 60 and the elastic body lip 70 together, forming the lubricant holding member 50.

Since the ring 60 and the elastic body lip 70 are combined together, the shape of the lubricant holding member 50 is the integral shape of a circular-ring-like annular portion 51 and a cylindrical portion 52. The annular portion 51 corresponds to the pawl 62 of the ring 60 and the elastic body lip 70. The cylindrical portion 52 corresponds to the ring main body 61.

At a small-diameter-side end of an inner peripheral surface of the ring main body 61, an annular groove 63 and a pawl 64 are formed so as to be continuous with each other in the axial direction. The pawl 64 is formed on the small diameter side of the groove 63. The groove 63 and the pawl 64 are formed to allow the lubricant holding member 50 to be attached to the outer ring 10.

Specifically, the pawl 13 of the outer ring 10 is fitted into the groove 63. The pawl 64 is fitted into the groove 12 in the outer ring 10. Consequently, the outer ring 10 and the lubricant holding member 50 are integrally fixed together.

A lubricant is fed into a space formed between the lubricant holding member 50 and the outer ring 10 as depicted around the lubricant holding member 50 in the lower part of FIG. 1. The lubricant is collected in a lower portion of the tapered roller bearing 1. The height of a surface Si of the lubricant is equal to the height of the elastic body lip 70 at the lowermost portion of the tapered roller bearing 1.

While the tapered roller bearing 1 remains stationary, the lubricant is in contact with a part of the outer ring 10, some of the tapered rollers 30, and a part of the cage 40. Rotation of the tapered roller bearing 1 allows the lubricant collected at the lower portion of the tapered roller bearing 1 to be scooped up in conjunction with the rotation. Consequently, the lubricant is fed to the first raceway surface 11, the second raceway surface 22, and the like. This reduces friction that may occur, for example, between each tapered roller 30 and the first raceway surface 11 and between each tapered roller 30 and the second raceway surface 22.

Figure 6:
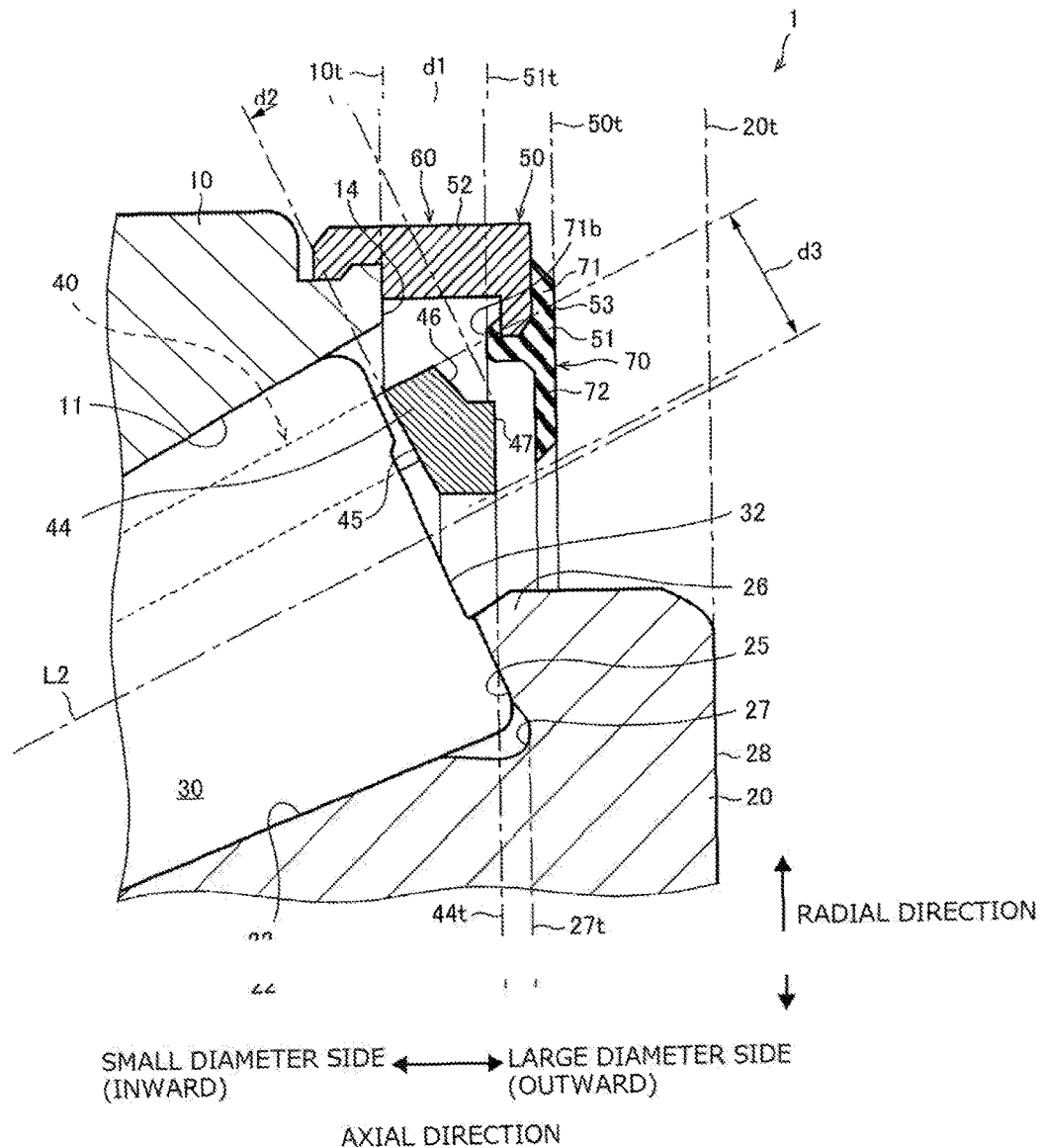
FIG. 6 is a sectional view of the tapered roller bearing in the first embodiment.

FIG. 6 is a sectional view of a part of the tapered roller bearing 1 which corresponds to enlargement of FIG. 5. With reference to FIG. 6, the shape of the cage 40 will be described.

As seen in the section depicted in FIG. 6, a cutout 46 is formed in the large-end-face holding portion 44 of the cage 40. The cutout 46 is formed radially outward and axially outward of the large-end-face holding portion 44 as seen in the section. In other words, the cutout 46 is formed near the thick walled portion 71 of the elastic body lip 70 of the lubricant holding member 50. The cutout 46 is formed all over the circumference of the large-end-face holding portion 44.

The cutout 46 is formed near the thick walled portion 71 of the elastic body lip 70. This allows the tapered roller bearing 1 to be designed such that the distance between the cage 40 and the elastic body lip 70 decreases while avoiding contact between the cage 40 and the elastic body lip 70.

In the present embodiment, the cage 40 is formed of resin, which can be easily molded and processed. Consequently, the cage 40 can be reduced in axial dimension compared to conventional cages. Specifically, for example, as depicted in FIG. 6, an axial position 44t of an axially outward end surface 47 of the large-end-face holding portion 44 is located axially inward of an axial position (corresponding to an axial end) 27t of a bottom surface of the groove 27 in the inner ring 20.

For example, a distance d1 between an axial position 10t of a large-diameter-side surface 14 of the outer ring 10 and an axial position 51t of the axially inward surface 71b (the surface 71b of the thick walled portion 71 of the elastic body lip 70) of the annular portion 51 of the lubricant holding member 50 may be set to 4 mm or less.

A dimension d2 of the large-end-face holding portion 44 of the cage 40 in a direction parallel to the roller axis L2 is smaller than a dimension d3 of the large-end-face holding portion 44 of the cage 40 in a direction perpendicular to the roller axis L2. This reduces the axial dimension of the cage 40, while providing the cage 40 with a sufficient radial dimension, allowing the large-end-face holding portion 44 to be made sufficiently strong.

Since the axial dimension of the large-end-face holding portion 44 of the cage 40 is reduced compared to the axial dimension of the large-end-face holding portion in the related art, the axial dimension of the lubricant holding member 50 can be reduced with contact between the cage 40 and the lubricant holding member 50 avoided. For example, an axial position 50t of an axially outward surface 53 of the lubricant holding member 50 is positioned axially inward of an axial position 20t of an axially outward bottom surface 28 of the inner ring 20.

Figure 7:
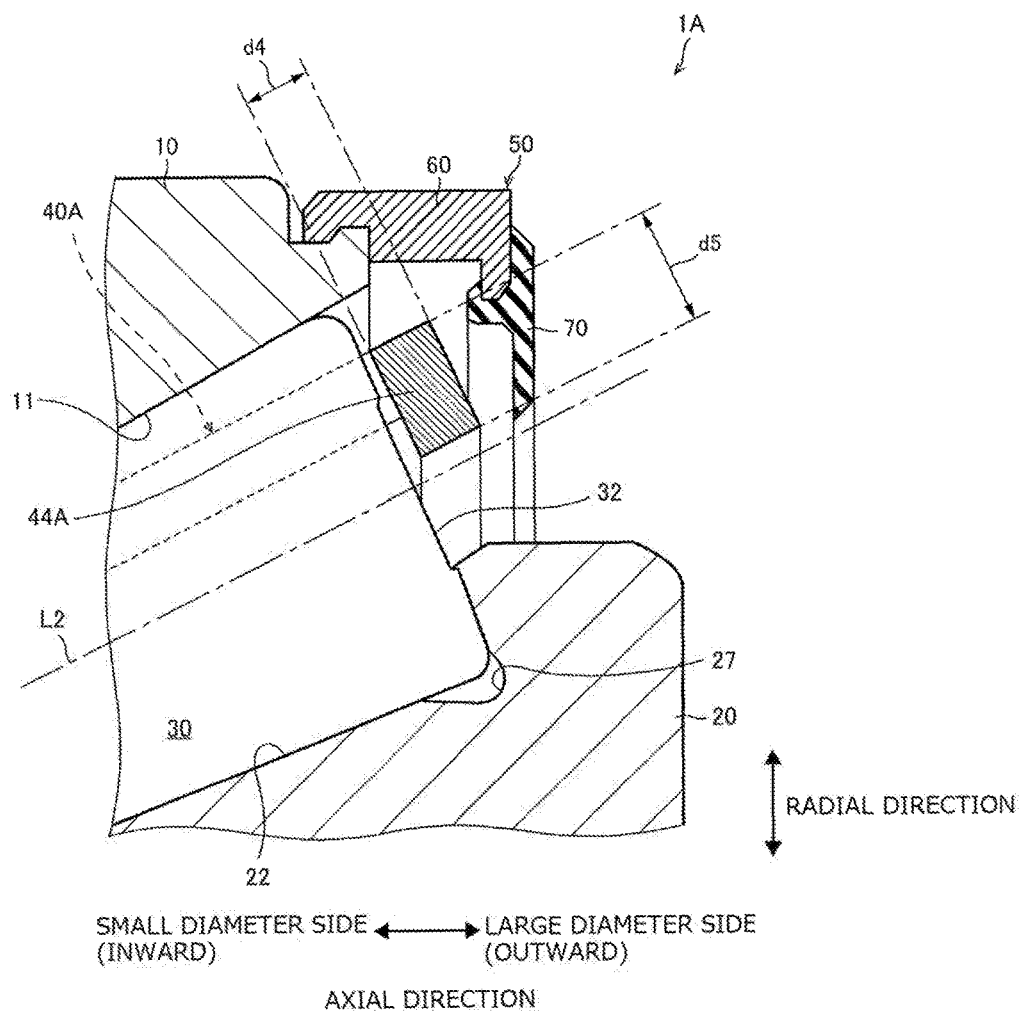
FIG. 7 is a sectional view of a tapered roller bearing in a first variation.

FIG. 7 is a sectional view depicting a part of a tapered roller bearing 1A in a first variation of the first embodiment. The tapered roller bearing 1A is different from the tapered roller bearing 1 in the first embodiment in the shape of the large-end-face holding portion 44A of the cage 40A. Specifically, the cutout 46 in the large-end-face holding portion 44 in the first embodiment is not formed in a large-end-face holding portion 44A. In other respects, the tapered roller bearing 1A has the same configuration as that of the tapered roller bearing 1 in the first embodiment.

Also for the large-end-face holding portion 44A, a dimension d4 in a direction parallel to the roller axis L2 is smaller than a dimension d5 in a direction perpendicular to the roller axis L2. This reduces the axial dimension of a cage 40A. The cage 40A is also provided with a sufficient radial dimension, allowing the large-end-face holding portion 44A to be made sufficiently strong.

In the above-described embodiments, the axial position 50t of the large-diameter-side surface 53 of the lubricant holding member 50 is positioned on the small diameter side with respect to the axial position 20t of the large-diameter-side bottom surface 28 of the inner ring 20. However, this configuration is not essential to the invention. The lubricant holding member may be designed to have any size according to the needed size of the tapered roller bearing.

In the above-described embodiments, the axial position 44t of the axially large-diameter-side end surface 47 of the large-end-face holding portion 44 is located on the small diameter side with respect to the axial position (corresponding to the axial end) 27t of the bottom surface of the groove 27 in the inner ring 20. However, this configuration is not essential to the invention. The axial position 44t of the axially large-diameter-side end surface 47 of the large-end-face holding portion 44 may be located at the same position as the axial position 27t of the bottom surface of the groove 27 in the inner ring 20 or located on the large diameter side with respect to the axial position 27t.

In the above-described embodiments, the dimension d2 of the large-end-face holding portion 44 of the cage 40 in the direction parallel to the roller axis L2 is smaller than the dimension d3 of the large-end-face holding portion 44 in the direction perpendicular to the roller axis L2. However, this configuration is not essential to the invention. For example, even if the dimension d2 is equal to or larger than the dimension d3, for example, formation of a cutout in the large-end-face holding portion 44 enables a reduction in the axial dimension of the cage. The cage in the invention is formed of resin and can thus be easily produced so as to have any shape.

In the above-described embodiments, the lubricant holding member 50 is attached to the outer peripheral surface of the outer ring 10. However, the invention is not limited to this. For example, the lubricant holding member 50 may be fixed to the outer ring 10 by being fitted to the inner peripheral surface of the outer ring 10.

In the above-described embodiments, the distance d1 between the axial position 10t of the large-diameter-side surface 14 of the outer ring 10 and the axial position 51t of the small-diameter-side surface 71b of the annular portion 51 of the lubricant holding member 50 is 4 mm or less. However, this configuration is not essential to the invention.

In the above-described embodiments, the lubricant holding member 50 includes the metal ring 60 and the elastic body lip 70. However, the invention is not limited to this. For example, the lubricant holding member 50 as a whole may be formed of an elastic body such as rubber.

The above-described embodiments are examples that allow the invention to be implemented. Therefore, the invention is not limited to the above-described embodiments but may be implemented by varying the embodiments as needed without departing from the spirits of the invention.

In the tapered roller bearing in the invention, possible friction between the cage and the lubricant holding member can be reduced. Furthermore, the tapered roller bearing can be downsized.

What is claimed is:
1. A tapered roller bearing comprising:
an outer ring having a first raceway surface on an inner peripheral surface of the outer ring;

an inner ring having a second raceway surface on an outer peripheral surface of the inner ring and arranged coaxially with the outer ring;
a plurality of tapered rollers arranged in a space between the first raceway surface and the second raceway surface, each of the tapered rollers being inclined with respect to a bearing axis such that a distance between a roller axis and the bearing axis increases from a small-diameter-side bottom face toward a large-diameter-side bottom face;
a resin cage in which a plurality of pockets is formed so that the tapered rollers are housed in the pockets, the cage including a large-end-face holding portion that faces the large-diameter-side bottom faces of the tapered rollers; and
a lubricant holding member fixed integrally to the outer ring and including (i) an elastic body lip and (ii) a ring having an axially outward end connected by way of an annular pawl to the elastic body lip and fixed to an axial end of the outer ring which is closer to the large-diameter-side bottom faces of the tapered rollers, wherein:
a radially outward portion of the elastic body lip is a thick-walled portion, which is thicker than the pawl of the ring in the axial direction, and a radially inward portion of the elastic body lip is a thin-walled portion, which is thinner than the thick-walled portion in the axial direction;
on an axially inward surface of the elastic body lip, a surface of the thick-walled portion is positioned inward of a surface of the thin-walled portion in the axial direction; and
an axial position of the axially inward surface of the elastic body lip is located axially inward of an axial position of an axially outward end surface of the large-end-face holding portion of the resin cage.

2. The tapered roller bearing according to claim 1, wherein the inner ring has, on the outer peripheral surface thereof, an annular recessed portion having a bottom surface including the second raceway surface, and
an axial end of the bottom surface of the recessed portion which is closer to the large-diameter-side bottom faces of the tapered rollers is positioned axially outward of the axially outward end surface of the large-end-face holding portion of the resin cage.

3. The tapered roller bearing according to claim 1, wherein
an axial end surface of the inner ring which is closer to the larger-diameter-side bottom faces of the tapered rollers is positioned axially outward of an axially outward end surface of the elastic body lip of the lubricant holding member.

4. The tapered roller bearing according to claim 1, wherein
a cutout is formed at a radially outward and axially outward portion of the large-end-face holding portion in a section including the bearing axis and any of the pockets in the cage.

5. The tapered roller bearing according to claim 1, wherein
at an end of the outer ring to which the lubricant holding member is fixed, an axial distance between an axial end surface of the outer ring and an axially inward end surface of the elastic body lip of the lubricant holding member is 4 mm or less.

6. The tapered roller bearing according to claim 1, wherein
in a section including the bearing axis and any of the pockets in the care, a maximum width of the large-end-face holding portion in a direction parallel to the roller axis is smaller than a maximum width of the large-end-face holding portion in a direction perpendicular to the roller axis.

* * * * *